Figure 1:
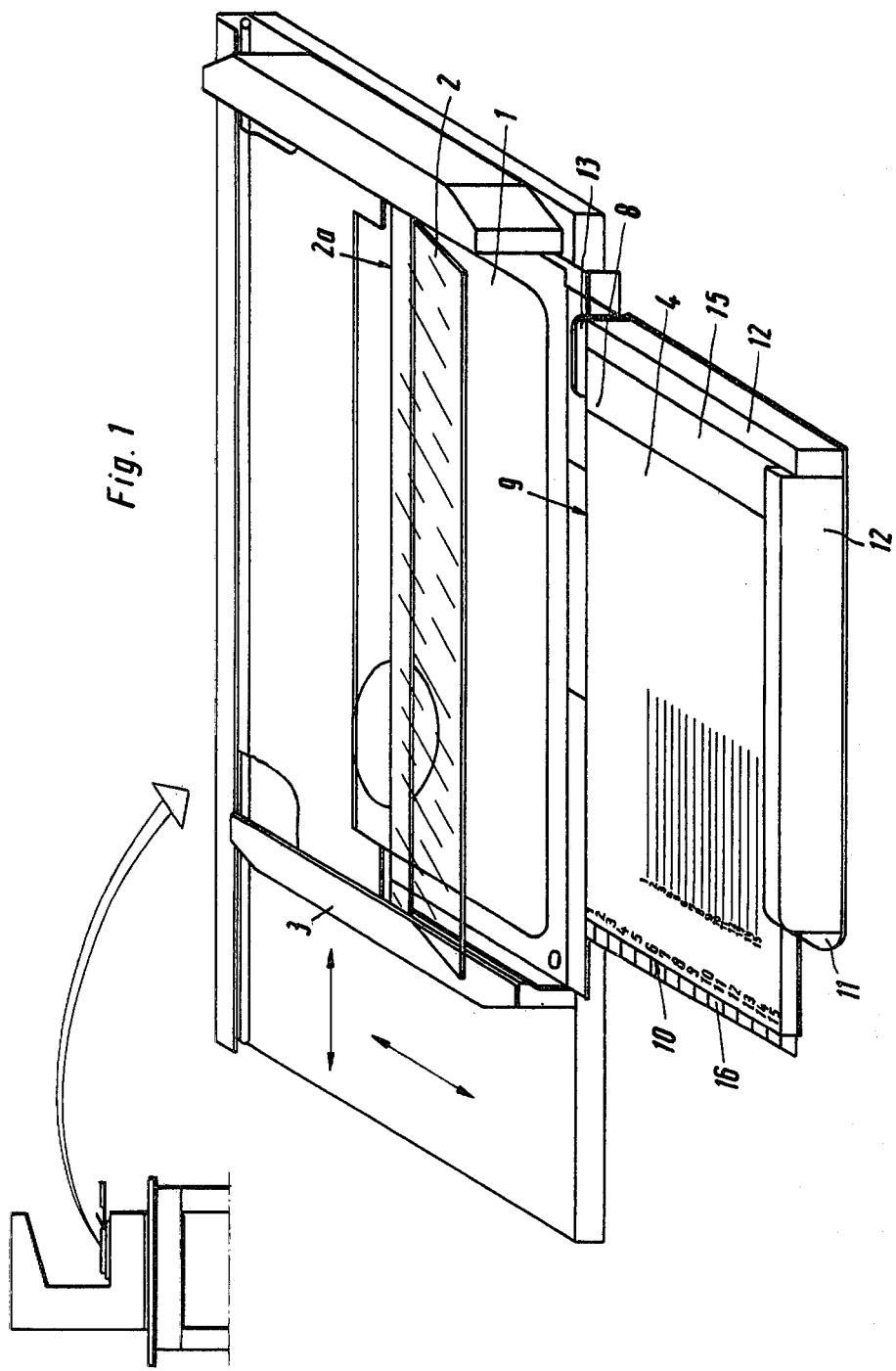

United States Patent [19]

Dabinski

[11] 4,302,082

[45] Nov. 24, 1981

[54] DEVICE FOR THE INSERTION OF MICROFICHE CARDS INTO READING INSTRUMENTS

[75] Inventor: Horst Dabinski, Wiesbaden, Fed. Rep. of Germany

[73] Assignee: Rudolf Jopp, Frankfurt, Fed. Rep. of Germany

[21] Appl. No.: 136,720

[22] Filed: Apr. 2, 1980

[30] Foreign Application Priority Data

Apr. 2, 1979 [DE] Fed. Rep. of Germany ....... 2913193

[51] Int. Cl.³ ............................................. G03B 23/08
[52] U.S. Cl. .................................... 353/27 R; 353/25; 353/DIG. 5
[58] Field of Search ..................... 353/25, 27 R, 27 A, 353/DIG. 5, 22, 23, 24

[56] References Cited

U.S. PATENT DOCUMENTS

| | | | |
|---|---|---|---|
| 3,438,703 | 4/1969 | Winnemann | 353/DIG. 5 |
| 3,476,474 | 11/1969 | Nerwin | 353/108 |
| 3,566,524 | 3/1971 | Irasek | 353/27 R |
| 3,640,613 | 2/1972 | Kitch | 353/DIG. 5 |
| 3,690,753 | 9/1972 | Dahl | 353/27 R |
| 3,778,143 | 12/1973 | Treher | 353/DIG. 5 |

Primary Examiner—John W. Shepperd
Attorney, Agent, or Firm—Schwartz, Jeffery, Schwaab, Mack, Blumenthal & Koch

[57] ABSTRACT

Disclosed is a device for the insertion of microfiche cards into a microfiche reader comprising a plurality of microfiche cards, each card having an image aperture part and a blank part with a perforation in one of the two corner areas of the blank part, a magazine containing a plurality of microfiche cards, the magazine being equipped at a location corresponding to the perforation of the microfiche card with a shaft, releasable from the magazine, the shaft extending through the perforations in the microfiche cards as a holder and a rotational axis for movement of the microfiche cards, and being open on a first lateral surface adjacent the shaft and on a second lateral surface perpendicular to the first lateral surface and facing away from the shaft, a film stage and magazine stage arrangement adapted for receiving the magazine wherein the magazine is positioned on the magazine stage such that the first open lateral surface of the magazine is pointing toward the film stage and the distance between the shaft and the rear edge of the film being equal to the length of the microfiche card measured between the perforation of the card and the outer edge of the image aperture part.

9 Claims, 8 Drawing Figures (A-A)

(B-B)

DEVICE FOR THE INSERTION OF MICROFICHE CARDS INTO READING INSTRUMENTS

The invention concerns a device for the insertion of microfiche cards into a microfiche reader. More particularly the device includes a magazine arrangement, comprising a magazine containing the microfiche cards in a superposed position with respect to each other, each microfiche card having an image aperture part and a blank part film stage is provided on the microfiche reader. The film stage is displaceable in two directions perpendicular to each other and consists of a glass base plate and a glass pressure plate arranged upon the base plate.

A fully automatic device for the insertion of microfiche cards from a magazine into a reading device is known in the art. Such device guides the microfiche cards between the lateral walls of a film magazine which is open toward the film stage. The microfiche cards are secured against unintentional dropping in this known arrangement by means of bilateral notchings. The magazine is provided on its side opposite the open side with a combined selection and ejection system, whereby the card selected may be ejected from the magazine for further transport into the reading instrument. In the process, the card involved is slid out slightly in the direction of the microfilm stage placed into its zero position from the magazine, gripped at its end exposed in this manner by transport rollers or sprockets and moved from the magazine to a stop corresponding to the zero position on the base plate. Simultaneously a space is moved into the magazine in place of the location to which the card will be returned in an inversely corresponding manner.

This known device is extremely expensive from a design standpoint in view of the fact that ejection, transport and return devices are required. A spacer apparatus for the return devices together with the corresponding controls for the ejection transport and return devices represent an investment in relation to the reader itself that is seldom justified as it is merely an accessory to the reader. Furthermore, because of its system integration, the device can be used in specially adapted equipment only. This eliminates its application in combination with a greater number of presently operating small instruments, not only for reasons of cost but also of design.

It is the object of the present invention to provide a device for the insertion of microfiche cards from film magazines into microfilm readers of the abovedescribed type. The device must be of simple design, capable of being used independently with various commercially available types of instruments and capable of secondary addition to existing instruments in a simple manner.

The invention consists of:
(a) microfiche cards, each having an image part and a blank part with a perforation in one of the two corner areas of the blank part,
(b) a magazine,
  (b1) having, at a location corresponding to the perforations of the microfiche cards, a shaft releasable from the magazine, to serve as the holding device and rotating axis for the microfiche card, and
  (b2) being open at a first lateral surface adjacent the shaft and a second lateral surface perpendicular to the first lateral surface and removed from the shaft;
(c) a magazine stage arranged at, and displaceable with, the film stage, the magazine stage having a receptacle for the magazine and being placed with respect to the reader window such that
  (c1) the open side of the magazine adjacent to the shaft is toward the film stage, and
  (c2) the distance between the shaft and the rear edge of the pressure plate corresponds to the length between the perforation of the microfiche card and the outer edge of the image aperture.

The invention provides a device that enables the insertion of microfiche cards from a magazine into reader instruments requiring almost no additional structural expense and being capable of addition to practically all of the commercially available types of instruments with the simplest possible manipulation. The microfilm cards remain securely anchored during use. Thus losses or accidental returns to the wrong location are eliminated. The attachment of the microfiche card with the magazine during use in combination with the stationary position of the magazine on a magazine stage which is displaceable on the microfilm stage insures the positioning of the microfiche card in the zero notch position of the microfilm stage without any adjustment. This is also true independently of the existing position of the microfilm stage in relation to the optics of the reader. The insertion or positioning is effected simply by rotating microfilm fiche out of the magazine, manually, around the shaft holding the card. The selection of the card is performed in any known manner. Thus, for example, in a simple and advantageous embodiment, the microfiche cards protrude from the magazine on the open side facing away from the film stage. The protruding area is provided with a conventional punched identification. It is, however, possible to use other known systems of selection. Other identifying notching may be applied to an edge of the card in combination of the partial opening of the closed lateral walls of the magazine.

In order to prevent the outward swivelling of the two microfiche cards adjacent to the card selected, the cards are conveniently provided with a rotational arrest acting in the manner of a pressure center. A spring arm is provided on the microfiche cards and a cam on the housing of the magazine. The cam on the magazine housing is located in the path of the rotation of the spring arm arranged on the microfiche card.

In this manner, the entertainment of the microfiche cards adjacent to the card selected as the result of frictional forces prevailing between them is reliably eliminated and a reselection, together with the replacement of undesired cards, avoided.

Figure 2:
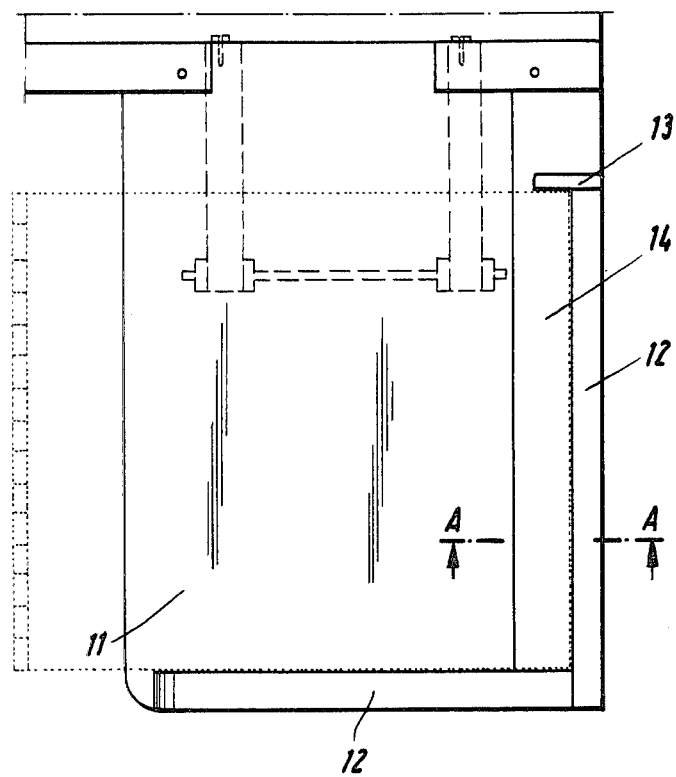
Figure 3:
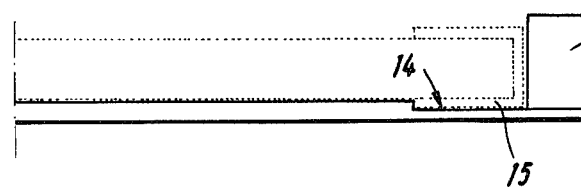
Figure 4:
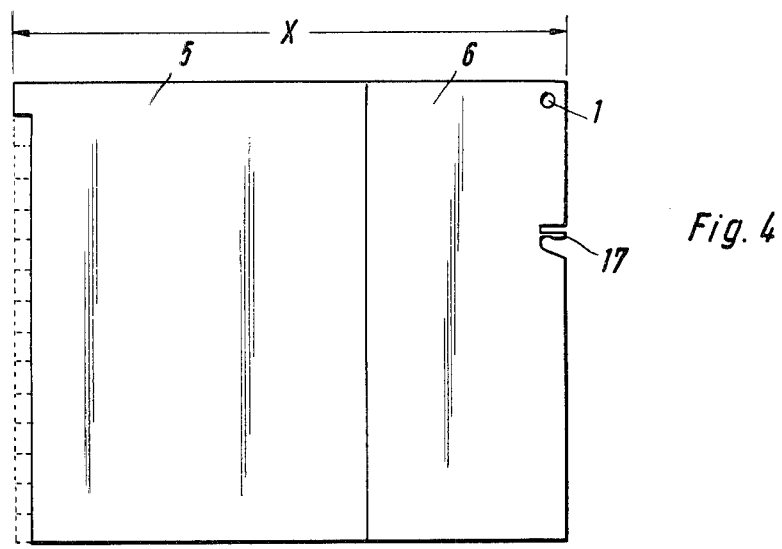
Figure 5:
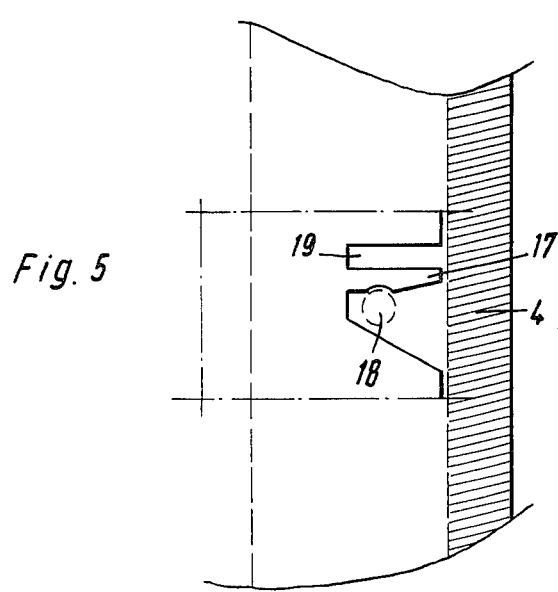
Figure 6:
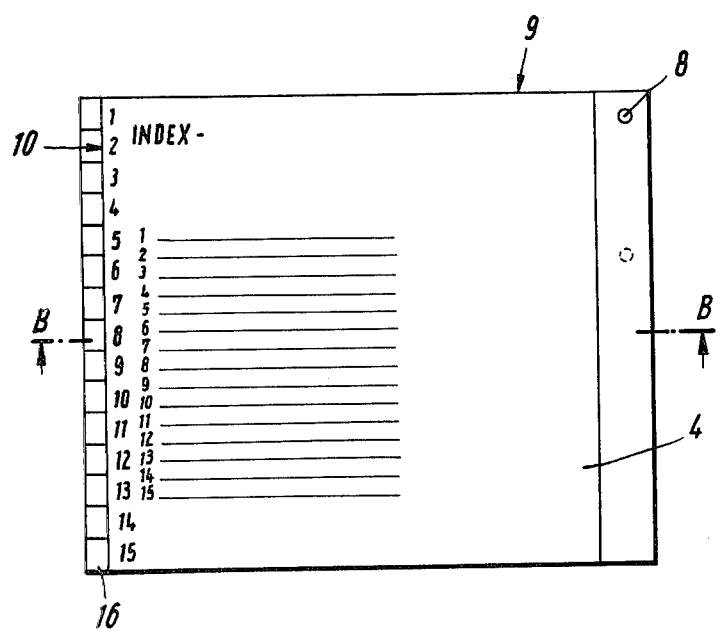
Figure 7:
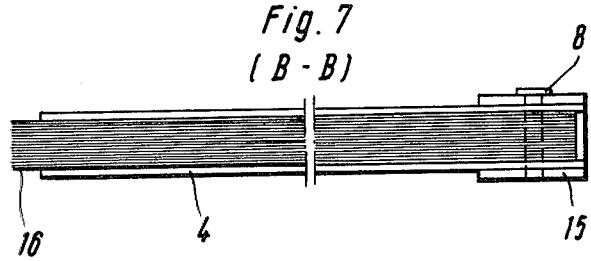
Figure 8:
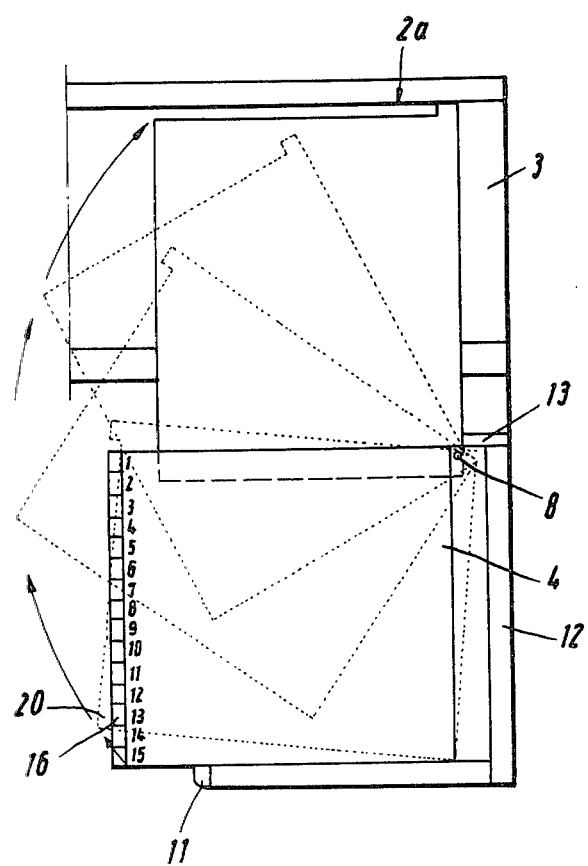

Examples of the invention are illustrated in the drawings as follows:

FIG. 1 is a perspective view of the microfilm stage of a microfilm reader with the magazine stage associated with it and the microfilm magazine within the magazine stage, FIG. 2 shows a top view of the magazine stage, FIG. 3 is a cross section along the line A—A through FIG. 2, FIG. 4 represents a view of a pocket like microfiche card, FIG. 5 depicts an enlarged partial representation of the microfiche card in the area of the rotational arrest, FIG. 6 is a front view of the microfilm magazine, FIG. 7 is a cross section along the line B—B of FIG. 6, and FIG. 8 is a schematic represenation of the process of the insertion of a microfiche card into the reader instrument.

In FIG. 1, the glass base plate is designated by 1 and the glass pressure plate with 2, both being the parts of a microfilm stage 3. The film stage is supported displaceably in two directions perpendicular to each other (indicated by the arrows on the left side of the stage). Microfiche cards shown in FIG. 4 are inserted from a magazine 4 into the microfilm stage. The microfiche cards of FIG. 4 consist of an image aperture part containing the film negative 5 and a blank part 6.

According to the invention
- (a) a perforation 7 is provided in one of the corner areas of the blank part 6 of the microfiche cards, and
- (b) the magazine (FIG. 6 and 7)
  - (b1) is equipped at a location corresponding to the perforation 7 of the microfiche card with a removable shaft 8 and
  - (b2) the lateral surface 9 adjacent to the shaft and the lateral surface 10 perpendicular to the side 9 and facing away from the shaft 8, are open, wherein
- (c) a magazine stage 11, displaceable together with the film stage 3 (shown in FIG. 1) with a receptacle for the magazine 4 is arranged in a position so that
  - (c1) the open side 9 adjacent to the shaft faces toward the film stage 3, and
  - (c2) the distance between the shaft 8 and the rear edge 2a of the pressure plate corresponds to the length X of the microfiche card measured between the perforation 7 and the front edge of the film pocket (FIG. 4).

The magazine stage 11 displays peripheral stops 12, 13 at least partially surrounding the magazine. In FIGS. 2 and 3, a bottom recess 14, is provided which is engaged by a peripheral frame 15 on the magazine. Thus, the magazine is secured against shifting on the magazine stage in all directions.

The microfiche cards protrude on the side 10 (FIG. 6) facing away from the film stage past the edge of the magazine 4 and are provided in this protruding area with a registering notching 16. A means for arresting the rotational movement acting in the manner of a pressure center is further arranged on the microfiche cards. In the preferred example of FIGS. 4 and 5 the means consists of a spring arm 17 on each of the microfiche cards. The arrest means cooperates with a cam protruding into the circle of rotation of the spring arm 17 and having the form of a pin 18 arranged on the magazine and also serving to stabilize the distance between the upper and lower magazine walls. The spring arm 17 retreats elastically under transverse pressure by means of the rear slit 19 and thus makes it possible for the card (after overcoming the resistance of the pressure center) to swivel outwardly around the shaft without entraining adjacent cards.

The positioning of a microfiche card is shown in FIG. 8. The magazine is inserted in the transverse position indicated in the stage of the magazine and the card desired selected with the aid of the identifying number printed on it and moved by means of engaging the corresponding indexing strap. In the case of the example, the process is represented by the example of the card in a first position in the magazine. The card is then rotated in the manner indicated by the broken outlines around the shaft 8, until the edge in the magazine pointing toward the film stage comes to rest laterally against a corresponding stop. The card then rotated in the manner indicated by the broken outlines around the shaft 8 until the edge in the magazine pointing toward the film stage comes to rest laterally against a corresponding stop. The card then is in its reading position without further adjustment. The rotation into position of the other cards takes place similarly by rotation around the shaft 8 within the circumference determined by the indexing projection and the subsequent engagement of the corner 20 of the rotated card exposed in this manner.

The positioning device operates without difficulty independently of the number of cards inserted in the magazine, i.e. a variable number of cards may be stored in the magazine as needed to a maximum amount determined by the internal height of the magazine. This advantage is to the arrangement of the cards such that they are being inserted individually into the reader. If an equalization of the thickness is desired in certain cases, it is sufficient to slide a suitably dimensioned equalizing ring or sleeve over the shaft 8 prior to insertion in the magazine.

I claim:
1. A device for the insertion of microfiche cards into a microfiche reader comprising:
   - (a) a plurality of microfiche cards each card having an image aperture part and a blank part with a perforation in one of the two corner areas of the blank part,
   - (b) a magazine containing said plurality of microfiche cards, said magazine
     - (b1) being equipped at a location corresponding to the perforation of the microfiche card with a shaft, releasible from the magazine, said shaft extending through said perforations in said microfiche cards as a holder and a rotational axis for movement of said microfiche cards, and
     - (b2) being open on a first lateral surface adjacent said shaft and on a second lateral surface perpendicular to said first lateral surface and facing away from said shaft,
   - (c) a film stage and magazine stage arrangement adapted for receiving said magazine wherein said magazine is positioned on the magazine stage such that
     - (c1) said first open lateral surface of said magazine is pointing toward the film stage, and
     - (c2) the distance between said shaft and the rear edge of the film stage being equal to the length of said microfiche card measured between said perforation of the card and the outer edge of said image aperture part.

2. The device of claim 1 wherein said microfiche cards protrude past the magazine on said second open lateral surface and are provided in the protruding area with indexing punch marks.

3. The device of claim 2, wherein said microfiche are equipped with means for arresting rotation about said shaft.

4. The device of claim 3, wherein said rotational arrest means acts in the manner of a pressure center.

5. The device of claim 4, wherein said rotational arrest means comprises a spring arm on said microfiche cards and a cam in said magazine housing, said cam being located in the path of rotation of the spring arm arranged on the card.

6. The device of claim 1, wherein said magazine stage comprises peripheral stops at least partially surrounding the magazine and a bottom recess for receiving an edge frame of said magazine.

7. The device of claim 1, wherein said film stage comprises a transparent base plate and a transparent pressure plate.

8. The device of claim 7, wherein said base and pressure plates comprise a transparent material selected from the group consisting of glass and clear plastic materials.

9. The device of claim 8, wherein said pressure plate is connected to said base plate by means of hinges, said hinged arrangement permitting the lifting of said pressure plate for insertion and removal of one of said microfiche cards into the microfiche reader.

* * * * *